United States Patent [19]
Harting et al.

[11] 3,842,663
[45] Oct. 22, 1974

[54] DEMODULATED RESONANCE ANALYSIS SYSTEM

[75] Inventors: Darrell R. Harting; John W. Taylor, both of Seattle, Wash.

[73] Assignee: The Boeing Company, Seattle, Wash.

[22] Filed: Dec. 1, 1972

[21] Appl. No.: 311,284

[52] U.S. Cl............................. 73/67.2, 73/71.4
[51] Int. Cl................. G01m 13/02, G01m 13/04
[58] Field of Search ............ 73/67, 71.4, 67.2, 69, 73/71.2

[56] References Cited
UNITED STATES PATENTS

| | | | |
|---|---|---|---|
| 3,548,648 | 12/1970 | Weichbrodt | 73/67 |
| 3,677,072 | 7/1972 | Weichbrodt | 73/67 |
| 3,699,806 | 10/1972 | Weichbrodt | 73/71.4 |

Primary Examiner—Richard C. Queisser
Assistant Examiner—Stephen A. Kreitman
Attorney, Agent, or Firm—Christensen, O'Connor, Garrison & Havelka

[57] ABSTRACT

An apparatus for detecting defects or flaws in mechanical systems with rotating and/or reciprocating components, such as gears or bearings. The scheme utilizes a transducer, which is excited at its mounted natural frequency by the vibrations caused by the impacting of components of a device across a flaw in a bearing or the like, a filter to eliminate background noise and signals other than the natural resonant frequency of the transducer, and a demodulator which converts the resulting signal into a series of pulses in which each pulse represents an individual impact. A spectral analysis is then performed on the series of pulses to obtain the location and nature of the surface defect in the bearing or other rotating and/or reciprocating component.

16 Claims, 9 Drawing Figures

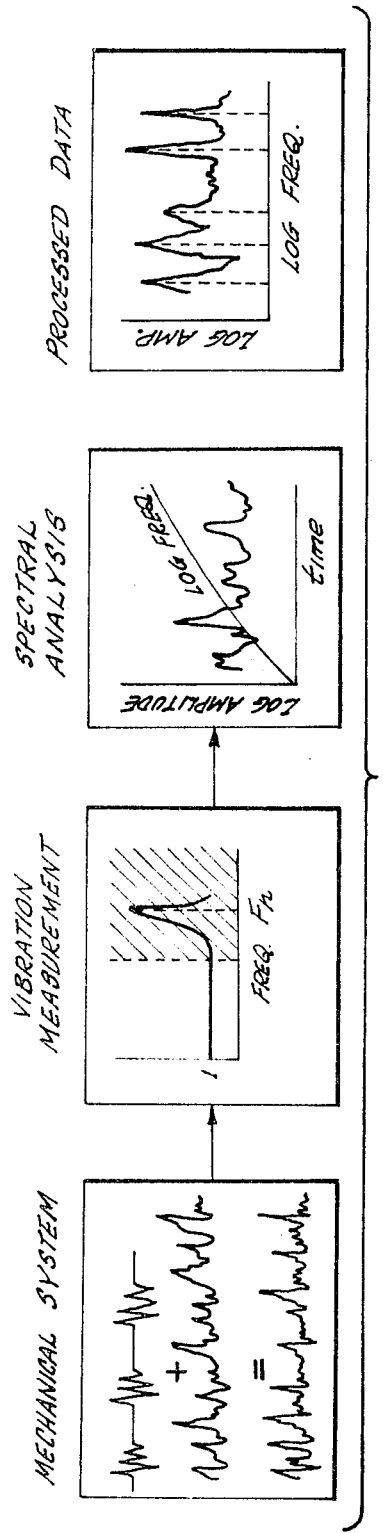
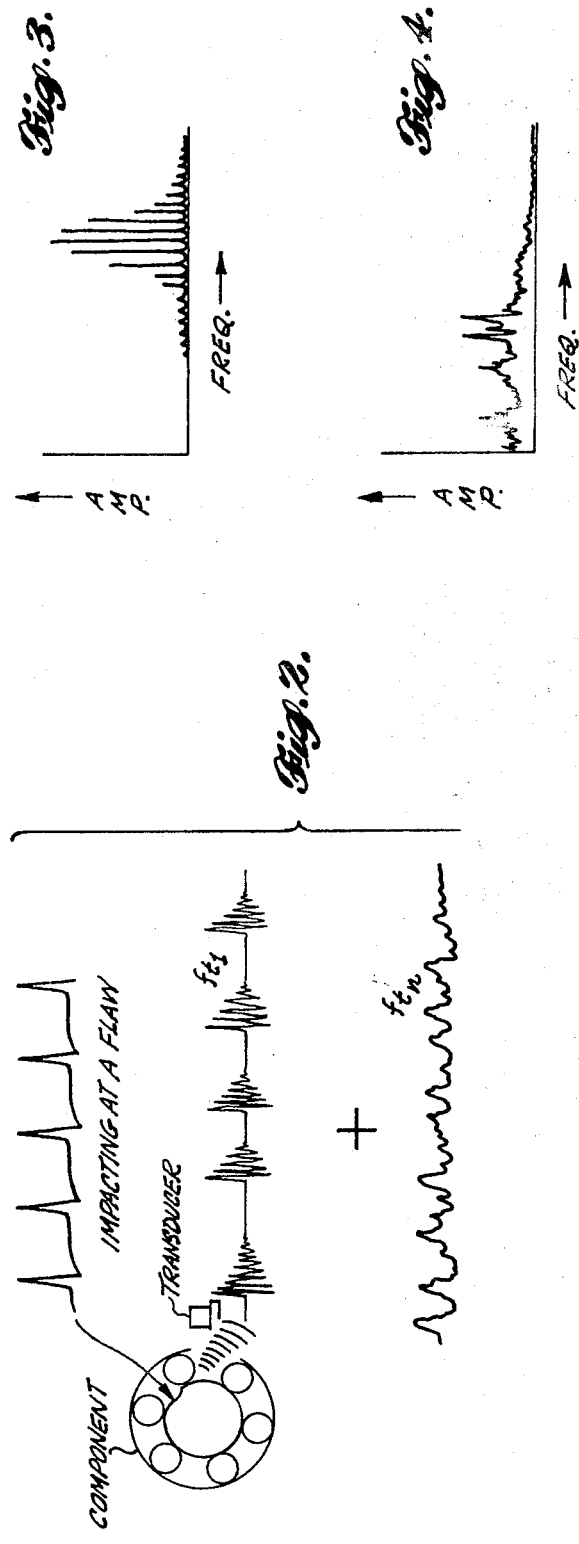

3,842,663

DEMODULATED RESONANCE ANALYSIS SYSTEM

BACKGROUND OF THE INVENTION

This invention relates primarily to that art which is concerned with locating surface defects or flaws in rotating and/or reciprocating machinery components while said components are operating under normal conditions.

In regard to the operation of machinery, especially high-speed, complex, industrial machines of engines utilizing a large number of reciprocating or rotating components, it has become increasingly important to be able to quickly and accurately identify flaws or defects in their operating parts. Of particular significance is the problem of locating such defects while the machine is operating in its natural environment and under its normal operating conditions. It is inconvenient and expensive to remove the machinery from its normal operating environment to a test bench for analysis. It is thus highly desirable to detect flaws in certain components of machines and engines before actual failure and to so detect while the machinery is in its normal operating mode.

Previously, there have been several distinct efforts in the early detection of machinery defects. The earliest method, which dates back to the first days of machinery, and which is still in use today, is the trained observer/listener. Frequently, an individual with a great deal of experience in working with a particular machine or engine can detect flaws in operating machinery. Certainly, however, this is a mysterious process, and even though sometimes amazingly accurate, it is undependable, on an event-to-event basis, and cannot be easily duplicated.

In an attempt to solve these natural disadvantages of the human analyzer, other methods of detection and analysis have been developed. An example of prior art detection scheme is shown in FIG. 1. FIG. 1 illustrates a popular method of analyzing excitation data of a mechanical system to detect possible defects or flaws in its components. With this technique, however, it is difficult to distinguish signals and noise emitting naturally from the mechanical system from the data that indicates flaws.

Most importantly, in analyzing the data generated by this system, the prior art did not recognize the significance of utilizing the response of the transducer at its mounted natural frequency for the detection of machine flaws. Thus, as indicated by the dashed area in FIG. 1, the response signal of the transducer at its natural (or ringing) frequency is excluded from analysis. By so doing, critical information concerning the location and nature of certain machine flaws is entirely lost.

Furthermore, the prior art low frequency analysis is unable to correlate spikes occurring at specific rotational frequencies with specific machine flaws, or defects. The present invention, however, recognizes that the natural frequency of the transducer contains information concerning flaws and makes maximum use of it by appropriate signal analysis.

Other attempts to detect mechanical defects in machines have also been found to be unreliable. These include: (1) oil temperature monitoring, which indicates only that a machine is in the process of failing (a detectable change in oil temperature noted); (2) analysis of the oil for suspended metal particles, which requires an extensive and lengthy analysis in order to determine a defective part; and (3) "acoustic emission" techniques (generated noise which results from atomic level structural dislocations in fatigued material) which are unreliable because of the difficulty in discriminating between the many high-frequency signals generated by the operation of complex machinery. Furthermore, acoustic emission techniques have been hampered by interpretative errors, in which the ringing of a transducer has been interpreted as actual distinct bursts of acoustic energy.

In view of the above, an object of the present invention is to provide a detection scheme which can quickly and accurately determine defects in reciprocating and/or rotating components of machinery.

Another object of the present invention is to provide a detection scheme which can analyze and determine machinery defects without removing the machinery from its natural environment.

A further object of this invention is to provide a detection scheme which will discriminate between the ordinary, background vibrating frequencies of a mechanical system, so that a proper frequency analysis may be performed.

SUMMARY OF THE INVENTION

In accordance with the above described objects, the invention utilizes the natural resonant frequency of a transducer in order to determine and locate the presence of mechanical defects or flaws in the surfaces of rotating and/or reciprocating components such as bearings. The movement of an adjacent mechanical component across a surface flaw or defect in a bearing will cause vibrations which are transmitted to a transducer, exciting the transducer at its natural resonant frequency. The transducer converts this excitation into electrical signals which are then amplified and filtered by a bandpass or high-pass filter, the resonant frequency of the transducer being passed by the filter. The signal is then demodulated, and a signal analysis performed on the resulting signal. The result of this signal analysis is information which is useful in determining the presence of, the nature of, and the location of surface flaws or defects in rotating and/or recirpocating components of a machine. reciprocating The above features and description of the invention will become more evident in the description of the preferred embodiment. This description refers to the following drawings:

FIG. 1 is a block diagram showing the individual steps of a prior art system of vibration analysis.

FIG. 2 is a diagram showing typical impact and noise data of a mechanical system having a bearing flaw.

FIG. 3 is a spectrum analysis of the transducer response when it has been energized by vibrations from a defect.

FIG. 4 is a spectrum analysis of a typical machine background noise.

DESCRIPTION OF THE PREFERRED EMBODIMENT

Figure 5:
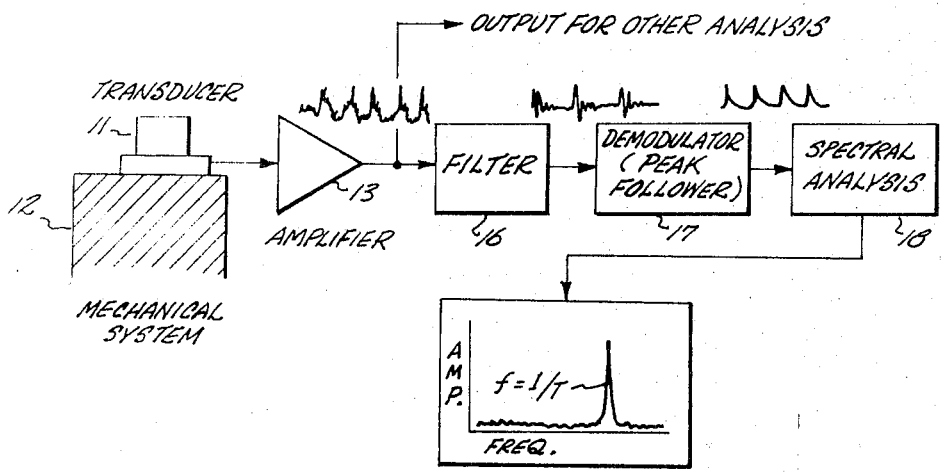
FIG. 5 is a block diagram of the present invention, with its associated signal analysis.

When a bearing or similar rotating device has a defect or flaw in one or more of its contacting surfaces, the movement of the bearing components, relative to one another, will result in a repetitive impacting. This repetitive impacting results in transmitted vibrations. A transducer is capable of responding to a wide range of vibration frequencies caused by a piece of machinery, such as jet engine. The particular excitation of the transducer caused by the repetitive impacting of the mechanical defect causes the transducer to vibrate at its natural frequency. The natural frequency referred to is the natural resonant frequency of the transducer when it is mounted or installed. The excitation of the transducer in this instance is comparable to the striking of a tuning fork or a glass crystal. If a tuning fork is physically "struck," it will vibrate at its natural resonant frequency and its vibrations will tend to die out in a "ringing" fashion. This is similar to the operation of the transducer in this instance, as the transducer is "hit" by the vibrations caused by the repetitive impacting of the defect, producing a vibration in the transducer at its mounted natural resonant frequency. The transducer may be selected so that other "system" noise is apt to be of lower frequency than its natural resonant frequency, and hence, such noise would not excite the transducer at its natural resonance. The output of the transducer resulting from the impacting of the defect dies out in a ringing fashion. The frequency with which the defect is impacted will depend upon the speed of rotation of the mechanical device.

Referring to FIG. 2, the periodic excitation and ringing of the transducer due to a defect is shown as signal $f_u$. The continuing repetition of the excitation of the transducer and the subsequent ringing thereof $(f_u)$, when transformed into the frequency domain, results in a bell-like line frequency spectrum as shown in FIG. 3. As mentioned above, a typical machine also has a great deal of vibration signals and noise associated with its normal operation, examples of such signals and noise being shown as signal $f_{tn}$ in FIG. 2, with its associated frequency spectrum shown in FIG. 4. The combination of these two signals, that is, the periodic high frequency impulse vibrations created by the impacting of the defect, and the background "system" vibration signals and nosie results in the total signal $(f_u + f_{tn})$ response of the transducer.

The selection of the value of the mounted resonant frequency of the transducer is important to the operation of the present invention, as the resonant frequency must be appropriate to the system being tested. The resonant frequency must be low enough so that the impacting of the defect will produce a usable response in the transducer; the vibration caused by the defect must cause the sensing element of the transducer to vibrate. Furthermore, the mounted natural resonant frequency of the transducer must be in such a range that excitation of the transducer at its mounted natural resonant frequency by background noise and the vibration frequencies of the rest of the machinery is minimized. Thus, the resonant frequency of the transducer may occur or be located in any frequency region which does not contain prominent energy caused by sources other than the defect. Typically, but not necessarily, the resonant frequency of the transducer is chosen so that it is higher than the majority of other signals and noise. For example, if one were interested in analyzing the operation of bearings in a jet engine, one might choose a transducer having a resonant frequency above 40 KHz if the predominant vibration frequencies of the jet engine, as well as other background noise, are located in the range from DC to 40 KHz. Thus, the transducer must be selected with a concern toward frequencies generated by other parts of the machine system under consideration, as well as the background noise. Many different kinds of transducers may be used in the present invention, so long as the frequency requirements are observed. The preferred embodiment utilizes a piezo-electric accelerometer.

Referring to FIG. 5, a block diagram of the present invention is shown. The transducer 11 is excited by the vibrations of a mechanical system 12, including the system impact across defects in rotational components. The output of the transducer is applied to an appropriate signal conditioner, such as the amplifier 13, which operates on the complete response $(f_u + f_{tn}$ in FIG. 2) of the transducer 11. The signal from the amplifier 13 is then applied to a filter 16. The filter may either be a band-pass filter, a high-pass filter, or a low-pass filter. If a band-pass filter is used, the pass region of the filter should be chosen to accommodate primarily the resonant frequency response of the transducer. A high-pass filter may be used when the resonant frequency of the transducer is higher than nearly all of the background signal frequencies of the particular machine being analyzed. The specifications of the high-pass filter are then chosen so that the cut-off of the filter is just below the resonance of the transducer, which thus allows those signals having frequencies higher than the cut-off frequency to pass through the filter. The low-pass filter specifications are chosen, of course, from the opposite perspective. The filter thus discriminates the natural resonant frequency of the transducer (the presence of which is an indication of the repetitive impacting of a defect in the machine) from the other vibrations of the machinery and background noise. Thus, the inherent imbalances of the operating system, as well as the natural background vibrations of other parts of the system, are suppressed by the invention, and the invention is, in effect, insensitive to energy other than that caused by the impacting of the defect. The invention thus isolates, for further analysis, information relevant to the defect from other irrelevant background vibrational information present in the operation of the machine.

From the filter 16, the signal is applied to a demodulator 17, which in the preferred embodiment is a standard rectifier and filter, or integrator, sometimes referred to as a peak-follower circuit. This circuit conventionally converts the output of the filter to a signal which is the envelope of the resonant frequency signal of the transducer. The "ringing" signal thus is "detected," and a signal which follows the peaks of the output of the filter is the result. A signal analysis 18 is then performed on the demodulated signal, and relevant information (such as the pulse repetition rate) concerning the defect is extracted from this demodulated signal. For instance, after the "envelope" signal has been constructed by the peak follower, the resulting signal may be integrated. The occurrence in time of the resulting pulse establishes the rate at which the flaw is struck, and the area under the pulse curve, determined by a separate integration step, is a measure of the severity of the flaw. Other analyses may be performed to attain additional information.

Figure 6:
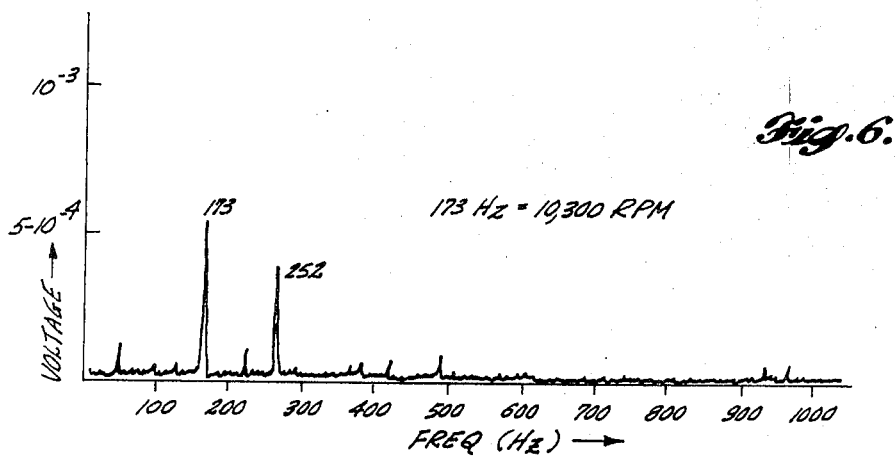
FIG. 6 is a signal analysis of a new bearing, using the prior art technique shown in FIG. 1.
Figure 7:
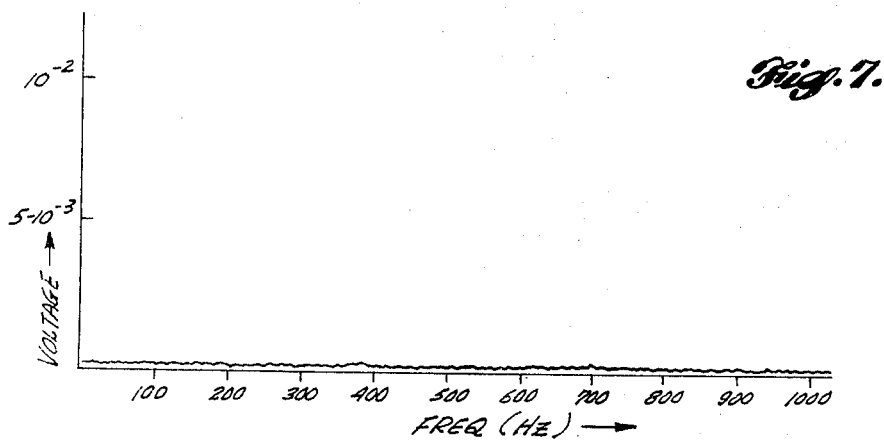
FIG. 7 is s signal analysis of a new bearing using the technique of the present invention.

FIGS. 6, 7, 8 and 9 show several amplitude-frequency plots of a rotating bearing, the rotation of the bearing under study being fixed at 10,380 RPM = 173 Hz. FIG. 6 shows an amplitude-frequency plot using the prior art system shown in FIG. 1 of a new bearing, without flaws. The frequency plot of FIG. 6 shows several spikes, primarily at 173 and 252 Hz, which represent vibration data occurring at those frequencies. Since this bearing was without flaws, the question of the presence of those spikes would have to be resolved by a dynamic analysis of the bearing and the rest of the system. FIG. 7 shows a plot which is the result of the demodulated resonance analysis of the present invention. This plot reveals no frequency spikes, indicating that there are no physical defects in the surface of the bearing itself, which is an accurate representation for the new bearing under study.

Figure 8:
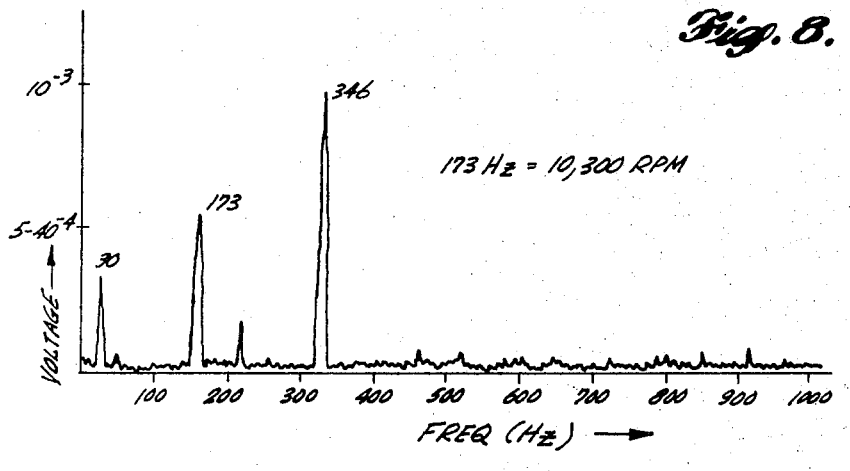
FIG. 8 is a signal analysis of a flawed bearing using the prior art technique shown in FIG. 1.
Figure 9:
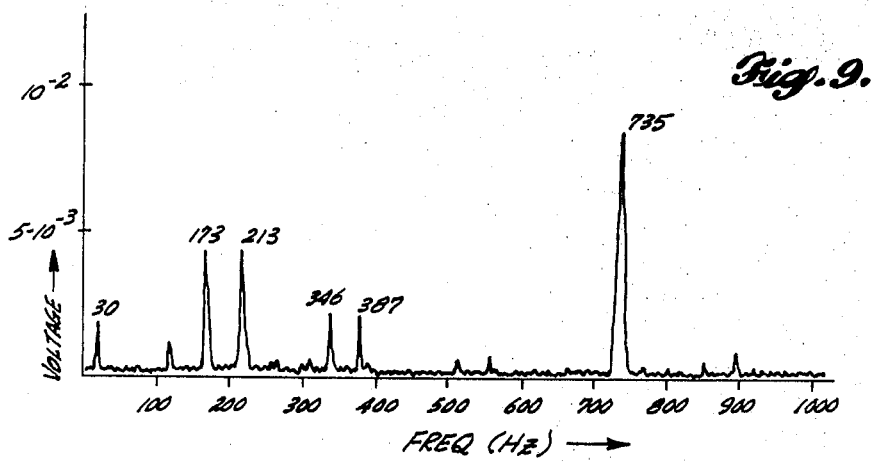
FIG. 9 is a signal analysis of a flawed bearing using the technique of the present invention.

FIGS. 8 and 9 represent amplitude-frequency plots of a bearing with a significant flaw in its outer race.

For the bearing under study, the frequency of impact was calculated according to the simplified formula:

$$\text{Impact Rate} = (n)(f)(R_1)/R_1 + R_2$$

Where $n$ = number of balls in the bearing
$f$ = inner race (shaft) turning frequency (Hz)
$R_1$ = radius of inner race
$R_2$ = radius of outer race The impact rate for the flaw in the outer race was calculated to be 728 Hz. Thus, in any frequency analysis method chosen to detect the impact rate, a spike should be present at 728 Hz, indicating that a defect is being impacted at that particular rate. FIG. 8 shows an amplitude-frequency plot of such a defective bearing achieved by the prior art system shown in FIG. 1, and described in the specification. Because only the low-frequency data produced by the transducer is analyzed in such a system, that is, frequencies well below the resonant frequency of the transducer, which in this case was approximately 80 KHz, it can be seen that the spectrum does not show any spikes above 346 Hz. The spikes may represent flaws, or they may represent normal machine vibration. Extensive analysis would be required to determine the meaning of those spikes. They most probably represent some dynamic imbalance or vibration inherent in the machine. Furthermore, because a range of vibration signals are present, it is often very difficult to distinguish between vibrations caused by flaws and those caused by normal operation. Prior art analyses additionally, because of the failure to include the natural response of the transducer, have not consistently correlated specific rotational frequencies with structural flaws, a correlation recognized and utilized by the present invention. Thus, the data produced by the prior art system (FIG. 8) does not recognize the existence of a flaw in the bearing under study. FIG. 9 shows an amplitude frequency plot for a flawed bearing (same bearing used to produce the data for FIG. 8) having multiple flaws, including a flaw in the outer race. The analysis shows several spikes, including one at 735 Hz which closely corresponds to the predicted frequency for the given flaw in the outer race. The other spikes represent other flaws or are "beat" frequencies between the actual flaw frequencies. The significance of all of the spikes can be resolved by analyzing the rotational dynamics of the system. The spikes do, however, represent flaws (or beat frequencies) rather than background noise, as the plot shows the response of the transducer at its natural frequency. The experimental data, in the case using the present invention, does show a spike at the predicted frequency associated with a flaw in the outer race of a particular bearing device.

The use of the resonant frequency of a transducer discriminates against the background vibrations of the rest of the machinery as well as background noises and provides an accurate indication of the presence of defects in components in machine. A subsequent analysis of the response of the transducer at its resonant frequency, as shown in FIGS. 7 and 9, when combined with the known configuration of the part under study and the rotational dynamics of the system results in significant information about the location and the size of the defect.

What is claimed is:

1. An apparatus for detecting flaws in mechanical components of machines, wherein the flaws and the natural vibration of the mechanical components in operation are a source of mechanical energy, comprising:

means for transforming the mechanical energy produced by the flaws and the natural vibration of the mechanical components into representative electrical signals, wherein said transforming means includes at least one transducer having a mounted natural resonant frequency sufficiently removed from the frequency of the natural vibration of the mechanical components such that said transducer is substantially only excited at its natural resonant frequency by the flaws in the mechanical components;

means for eliminating that portion of said electrical signals having frequencies with substantial energy other than said resonant frequency of said transforming means while retaining that portion of said electrical signals having frequencies substantially equal to said resonant frequency of said transforming means; and means for analyzing said retained signals to determine the existence of a flaw in a mechanical component of a machine.

2. An apparatus in accordance with claim 1, including means for demodulating the output of said frequency elimination means.

3. An apparatus in accordance with claim 2 wherein said mechanical defect causes the transducer to vibrate at its mounted natural resonant frequency, said transducer producing an electrical output frequency spectrum containing said natural resonant frequency of the transducer in addition to other vibrations and noise associated with the mechanical structure.

4. An apparatus in accordance with claim 3 wherein the amplitude of an electrical signal associated with the said natural resonant frequency of the transducer by said transducer is a function of the severity of said mechanical defect.

5. An apparatus in accordance with claim 4 wherein said transducer produces an electrical signal output each time said mechanical defect is impacted by another part of the mechanical structure.

6. An apparatus in accordance with claim 5 wherein said frequency elimination means is a filter.

7. An apparatus in accordance with claim 6 wherein said filter is a band-pass filter, the mounted natural resonant frequency of the transducer being the center of the pass-band.

8. An apparatus in accordance with claim 7 wherein said demodulating means is a peak follower circuit, the output signal of which is the signal envelope of the output of said band-pass filter.

9. An apparatus in accordance with claim 8 wherein said transducer is piezo-electric accelerometer.

10. An apparatus in accordance with claim 9, including an amplifier, connected to said accelerometer and said filter for amplifying the output of said accelerometer.

11. An apparatus in accordance with claim 10, including an integrator, connected to said demodulator, said integrator integrating the output of said demodulator, to determine the area under the curve provided by said demodulator.

12. A method for detecting flaws in mechanical components of machines comprising the steps of:
 exciting a transducer at its mounted natural resonant frequency, wherein said natural resonant frequency is sufficiently removed from the frequency of the natural vibration of the mechanical components such that said transducer is substantially only excited at its natural resonant frequency by the flaws in the mechanical components;
 transforming said mechanical energy into representative electrical signals;
 eliminating electrical signals not associated with the mechanical flaws; and
 recognizing the presence of a remaining electrical signal which is associated with the mechanical flaws to obtain information concerning the flaws.

13. A process in accordance with claim 12, including the step of amplifying said representative electrical signals.

14. A process in accordance with claim 13, wherein the step of eliminating electrical signals includes eliminating electrical signals having frequencies other than the mounted natural resonant frequency of said transducer.

15. A process in accordance with claim 14, including demodulating said mounted natural resonant frequency signal of said transducer.

16. A process in accordance with claim 15, wherein the step of recognizing includes integrating the demodulated resonant frequency signal.

* * * * *

UNITED STATES PATENT OFFICE
CERTIFICATE OF CORRECTION

Patent No. 3,842,663          Dated October 22, 1974

Inventor(s) Darrell R. Harting and John W. Taylor

It is certified that error appears in the above-identified patent and that said Letters Patent are hereby corrected as shown below:

Column 6, line 62, between the words "transducer" and "by" insert the word --produced--.

Column 7, line 12, between the words "is" and "piezo-electric" insert the word --a--.

Signed and sealed this 24th day of December 1974.

(SEAL)
Attest:

McCOY M. GIBSON JR.
Attesting Officer

C. MARSHALL DANN
Commissioner of Patents